(12) United States Patent
Gaal et al.

(10) Patent No.: US 9,955,442 B2
(45) Date of Patent: Apr. 24, 2018

(54) SYNCHRONIZATION CHANNEL DESIGN FOR NEW CARRIER TYPE

(71) Applicant: QUALCOMM Incorporated, San Diego, CA (US)

(72) Inventors: Peter Gaal, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 13/836,711

(22) Filed: Mar. 15, 2013

(65) Prior Publication Data

US 2013/0250818 A1    Sep. 26, 2013

Related U.S. Application Data

(60) Provisional application No. 61/613,428, filed on Mar. 20, 2012.

(51) Int. Cl.
*H04W 56/00* (2009.01)
*H04J 11/00* (2006.01)

(52) U.S. Cl.
CPC ......... *H04W 56/00* (2013.01); *H04J 11/0069* (2013.01)

(58) Field of Classification Search
CPC ............... H04W 56/001; H04J 11/0069; H04J 11/0073; H04J 11/0076; H04J 11/0083; H04J 11/0086

(Continued)

(56) References Cited

U.S. PATENT DOCUMENTS

| 2010/0118839 A1 | 5/2010 | Malladi et al. |
| 2012/0046056 A1 | 2/2012 | Luo et al. |

(Continued)

FOREIGN PATENT DOCUMENTS

| EP | 2288098 A2 | 2/2011 |
| WO | 2007083912 A1 | 7/2007 |

(Continued)

OTHER PUBLICATIONS

Intel Corporation: "Frequency and Time Synchronization aspects of additional Carrier Type", 3GPP Draft; R1-120611CA New Carrier Synchronization, 3rd Generation Partnership Project (3GPP), Mobile Competence Centre; 650, Route Des Lucioles; F-06921 Sophia-Antipolis Cedex; France, vol. RAN WG1, No. Dresden, Germany; Feb. 6, 2012-Feb. 10, 2012, Feb. 1, 2012 (Feb. 1, 2012), XP050563248.

(Continued)

*Primary Examiner* — Pao Sinkantarakorn
(74) *Attorney, Agent, or Firm* — Patterson & Sheridan, L.L.P.

(57) ABSTRACT

Certain aspects of the present disclosure relate to synchronization channel design for a new carrier type. In certain aspects, a User Equipment (UE) may first search for legacy locations of PSS (Primary Synchronization Signal) and SSS (Secondary Synchronization Signal), and attach to a cell that transmits the legacy PSS/SSS. Then the UE may be provided with information indicating a search space for PSS and SSS of a new carrier. The UE may then search for the PSS and SSS for the new carrier based on the received information. The relative spacings in time between the PSS and SSS for the first carrier may be different from the relative spacings in time between the PSS and SSS for the second carrier. In alternative aspects, the UE may receive a frequency offset value and determine PSS/SSS locations for the new carrier (Continued)

based on the frequency offset value and spaced center frequencies.

50 Claims, 10 Drawing Sheets

(58) Field of Classification Search
USPC ......... 370/277, 280, 281, 310–350, 498–520
See application file for complete search history.

(56) References Cited

U.S. PATENT DOCUMENTS

| | | | |
|---|---|---|---|
| 2013/0003672 A1* | 1/2013 | Dinan | H04L 1/00 370/329 |
| 2013/0039331 A1 | 2/2013 | Koorapaty et al. | |
| 2013/0051373 A1 | 2/2013 | Ro et al. | |
| 2013/0142141 A1* | 6/2013 | Dinan | 370/329 |
| 2013/0195069 A1* | 8/2013 | Frederiksen | H04W 48/12 370/330 |
| 2013/0229953 A1* | 9/2013 | Nam et al. | 370/280 |
| 2013/0242974 A1* | 9/2013 | Li | 370/350 |
| 2014/0169361 A1* | 6/2014 | Kim et al. | 370/350 |

FOREIGN PATENT DOCUMENTS

| | | |
|---|---|---|
| WO | 2013006379 A1 | 1/2013 |
| WO | 2013025069 A1 | 2/2013 |

OTHER PUBLICATIONS

International Search Report and Written Opinion—PCT/US2013/032721—ISA/EPO—Aug. 12, 2013.
SAMSUNG: "Time and Frequency Syncronization on Additional Type Carriers", 3GPP Draft; R1-114220 Synchronization on New Carrier Type, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 14, 2011-Nov. 18, 2011, Nov. 8, 2011 (Nov. 8, 2011), XP050562149.
Bengt Lindoff et al: "A robust cell search algorithm for 3GPP LTE", Wireless Conference, EW 2009, European, IEEE, Piscataway, NJ, USA, May 17, 2009 (May 17, 2009), pp. 303-307, XP031583316.
NEC Group: "Discussion on time and frequency synchronisation for the Additional Carrier type", 3GPP Draft; R1-120247 Discussion on Time-Frequency Synch for Additional Carrier, 3rd Generation Partnership Project (3GPP), Mobile Competence Centre; 650, Route Des Lucioles; F-06921 Sophia-Antipolis Cedex ; France, vol. RAN WG12-13, 15-26, 30-40, 42-52, No. Dresden, Germany, Feb. 6, 2012-Feb. 10, 2012, Jan. 31, 2012 (Jan. 31, 2012), XP050562802.
NEC Group: "Discussion on time frequency synchronisation for the extension carrier", 3GPP Draft; R1-113869 Discussion on Time-Frequency Synch for the Extension Carrier-CLN2, 3rd Generation Partnership Project (3GPP), Mobile Competence Centre; 650, Route Des Lucioles ; F-06921 Sophia-Antipolis Cedex ; France, vol. RAN WG1, No. San Francisco, USA, Nov. 14, 2011-Nov. 18, 2011, Nov. 8, 2011 (Nov. 8, 2011), XP050561953.
Partial International Search Report—PCT/US2013/032721—ISA/EPO, Jun. 18, 2013.

* cited by examiner

SYNCHRONIZATION CHANNEL DESIGN FOR NEW CARRIER TYPE

CLAIM OF PRIORITY UNDER 35 U.S.C. § 119

The present Application for Patent claims priority to U.S. Provisional Application No. 61/613,428, entitled "SYNCHRONIZATION CHANNEL DESIGN FOR NEW CARRIER TYPE," filed Mar. 20, 2012, and assigned to the assignee hereof and hereby expressly incorporated by reference herein.

FIELD

Certain aspects of the present disclosure generally relate to wireless communications and, more specifically, to synchronization channel design for new carrier type.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communications by a user equipment (UE). The method generally includes detecting a primary synchronization signal (PSS) and secondary synchronization signal (SSS) for a first carrier, receiving information indicating a search space for a PSS and SSS of a second carrier, and searching for the PSS and SSS of the second carrier based on the received information, wherein relative spacings in time between the PSS and SSS for the first carrier are different from the relative spacings in time between the PSS and SSS for the second carrier.

Certain aspects of the present disclosure provide an apparatus for wireless communications by a user equipment (UE). The apparatus generally includes means for detecting a primary synchronization signal (PSS) and secondary synchronization signal (SSS) for a first carrier, means for receiving information indicating a search space for a PSS and SSS of a second carrier, and means for searching for the PSS and SSS of the second carrier based on the received information, wherein relative spacings in time between the PSS and SSS for the first carrier are different from the relative spacings in time between the PSS and SSS for the second carrier.

Certain aspects of the present disclosure provide an apparatus for wireless communications by a user equipment (UE). The apparatus generally includes at least one processor and a memory coupled to the at least one processor. The at least one processor is generally configured to detect a primary synchronization signal (PSS) and secondary synchronization signal (SSS) for a first carrier, receive information indicating a search space for a PSS and SSS of a second carrier, and search for the PSS and SSS of the second carrier based on the received information, wherein relative spacings in time between the PSS and SSS for the first carrier are different from the relative spacings in time between the PSS and SSS for the second carrier.

Certain aspects of the present disclosure provide a computer program product for wireless communications by a user equipment (UE). The computer program product generally includes a computer-readable medium comprising code for detecting a primary synchronization signal (PSS) and secondary synchronization signal (SSS) for a first carrier, receiving information indicating a search space for a PSS and SSS of a second carrier, and searching for the PSS and SSS of the second carrier based on the received information, wherein relative spacings in time between the PSS and SSS for the first carrier are different from the relative spacings in time between the PSS and SSS for the second carrier.

Certain aspects of the present disclosure provide a method for wireless communications by a base station (BS). The method generally includes transmitting a primary synchronization signal (PSS) and secondary synchronization signal (SSS) for a first carrier, transmitting information indicating, to a user equipment (UE), a search space for a PSS and SSS of a second carrier, and transmitting the PSS and SSS of the second carrier based on the transmitted information, wherein relative spacings in time between the PSS and SSS for the first carrier are different from the relative spacings in time between the PSS and SSS for the second carrier.

Certain aspects of the present disclosure provide an apparatus for wireless communications by a user equipment (BS). The apparatus generally includes means for transmitting a primary synchronization signal (PSS) and secondary synchronization signal (SSS) for a first carrier, means for transmitting information indicating, to a user equipment (UE), a search space for a PSS and SSS of a second carrier, and means for transmitting the PSS and SSS of the second carrier based on the transmitted information, wherein relative spacings in time between the PSS and SSS for the first carrier are different from the relative spacings in time between the PSS and SSS for the second carrier.

Certain aspects of the present disclosure provide an apparatus for wireless communications by a user equipment (BS). The apparatus generally includes at least one processor and a memory coupled to the at least one processor. The at least one processor is generally configured to transmit a primary synchronization signal (PSS) and secondary synchronization signal (SSS) for a first carrier, transmit information indicating, to a user equipment (UE), a search space for a PSS and SSS of a second carrier, and transmit the PSS and SSS of the second carrier based on the transmitted information, wherein relative spacings in time between the PSS and SSS for the first carrier are different from the relative spacings in time between the PSS and SSS for the second carrier.

Certain aspects of the present disclosure provide a computer program product for wireless communications by a user equipment (BS). The computer program product generally includes a computer-readable medium comprising code for transmitting a primary synchronization signal (PSS) and secondary synchronization signal (SSS) for a first carrier, transmitting information indicating, to a user equipment (UE), a search space for a PSS and SSS of a second carrier, and transmitting the PSS and SSS of the second carrier based on the transmitted information, wherein relative spacings in time between the PSS and SSS for the first carrier are different from the relative spacings in time between the PSS and SSS for the second carrier.

Certain aspects of the present disclosure provide a method for wireless communications by a user equipment (UE). The method generally includes determining a frequency offset value, determining locations for detecting a primary synchronization signal (PSS) and secondary synchronization signal (SSS) for a carrier based on the frequency offset value and spaced center frequencies, and searching for the PSS and SSS of the carrier at the determined locations.

Certain aspects of the present disclosure provide an apparatus for wireless communications by a user equipment (UE). The apparatus generally includes means for determining a frequency offset value, means for determining locations for detecting a primary synchronization signal (PSS) and secondary synchronization signal (SSS) for a carrier based on the frequency offset value and spaced center frequencies, and means for searching for the PSS and SSS of the carrier at the determined locations.

Certain aspects of the present disclosure provide an apparatus for wireless communications by a user equipment (UE). The apparatus generally includes at least one processor and a memory coupled to the at least one processor. The at least one processor is generally configured to determine a frequency offset value, determine locations for detecting a primary synchronization signal (PSS) and secondary synchronization signal (SSS) for a carrier based on the frequency offset value and spaced center frequencies, and search for the PSS and SSS of the carrier at the determined locations.

Certain aspects of the present disclosure provide a computer program product for wireless communications by a user equipment (UE). The computer program product generally includes a computer-readable medium comprising code for determining a frequency offset value, determining locations for detecting a primary synchronization signal (PSS) and secondary synchronization signal (SSS) for a carrier based on the frequency offset value and spaced center frequencies, and searching for the PSS and SSS of the carrier at the determined locations.

Certain aspects of the present disclosure provide a method for wireless communications by a base station (BS). The method generally includes determining a frequency offset value, determining locations for transmitting a primary synchronization signal (PSS) and secondary synchronization signal (SSS) for a carrier, for detection by a user equipment (UE), based on the frequency offset value and spaced center frequencies, and transmitting the PSS and SSS of the carrier at one of the determined locations.

Certain aspects of the present disclosure provide an apparatus for wireless communications by a user equipment (BS). The apparatus generally includes means for determining a frequency offset value, means for determining locations for transmitting a primary synchronization signal (PSS) and secondary synchronization signal (SSS) for a carrier, for detection by a user equipment (UE), based on the frequency offset value and spaced center frequencies, and means for transmitting the PSS and SSS of the carrier at one of the determined locations.

Certain aspects of the present disclosure provide an apparatus for wireless communications by a user equipment (BS). The apparatus generally includes at least one processor and a memory coupled to the at least one processor. The at least one processor is generally configured to determine a frequency offset value, determine locations for transmitting a primary synchronization signal (PSS) and secondary synchronization signal (SSS) for a carrier, for detection by a user equipment (UE), based on the frequency offset value and spaced center frequencies, and transmit the PSS and SSS of the carrier at one of the determined locations.

Certain aspects of the present disclosure provide a computer program product for wireless communications by a user equipment (BS). The computer program product generally includes a computer-readable medium comprising code for determining a frequency offset value, determining locations for transmitting a primary synchronization signal (PSS) and secondary synchronization signal (SSS) for a carrier, for detection by a user equipment (UE), based on the frequency offset value and spaced center frequencies, and transmitting the PSS and SSS of the carrier at one of the determined locations.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
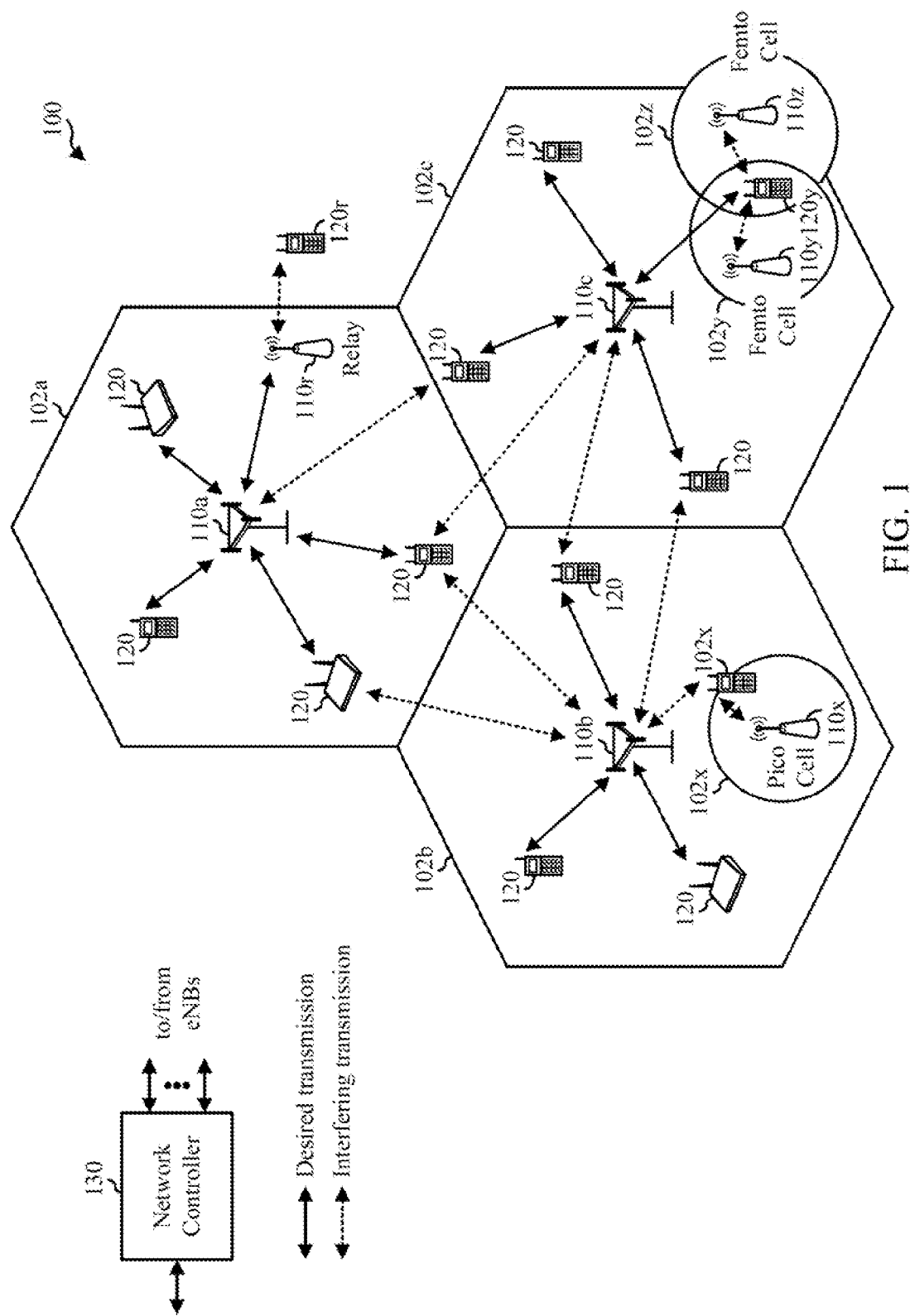
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.4, 3, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.4, 3, 5, 10, or 20 MHz, respectively.

Figure 2:
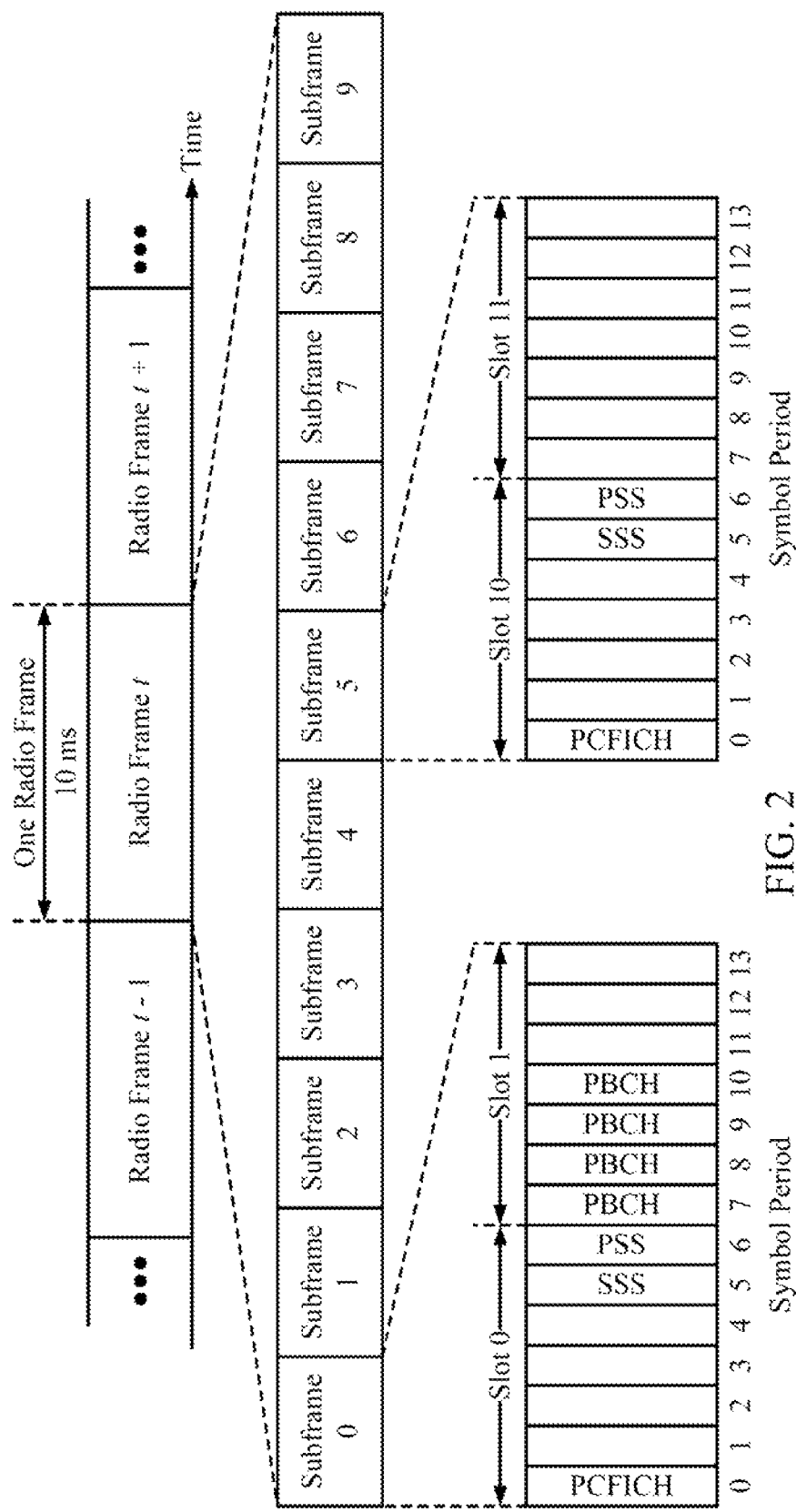
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
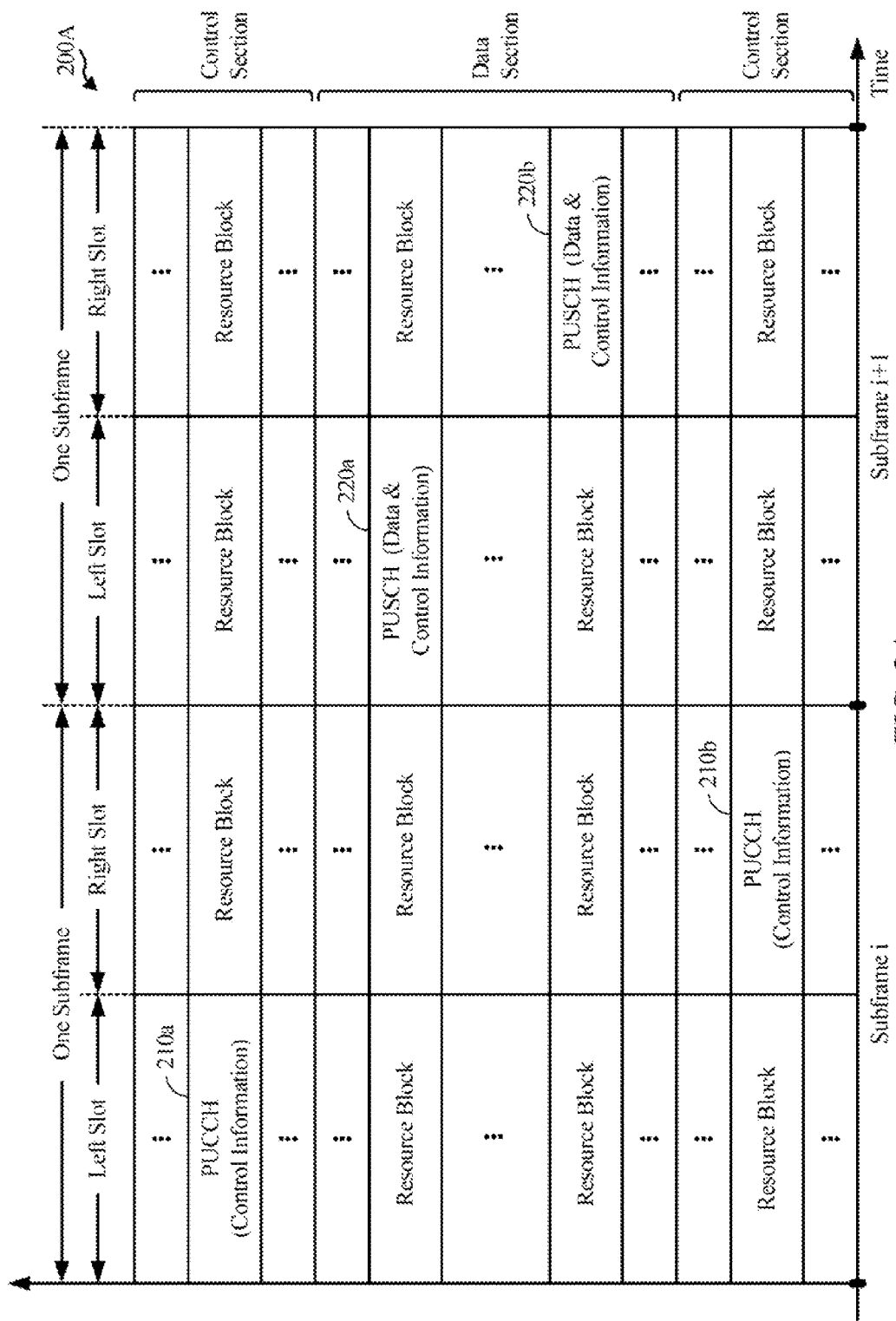
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
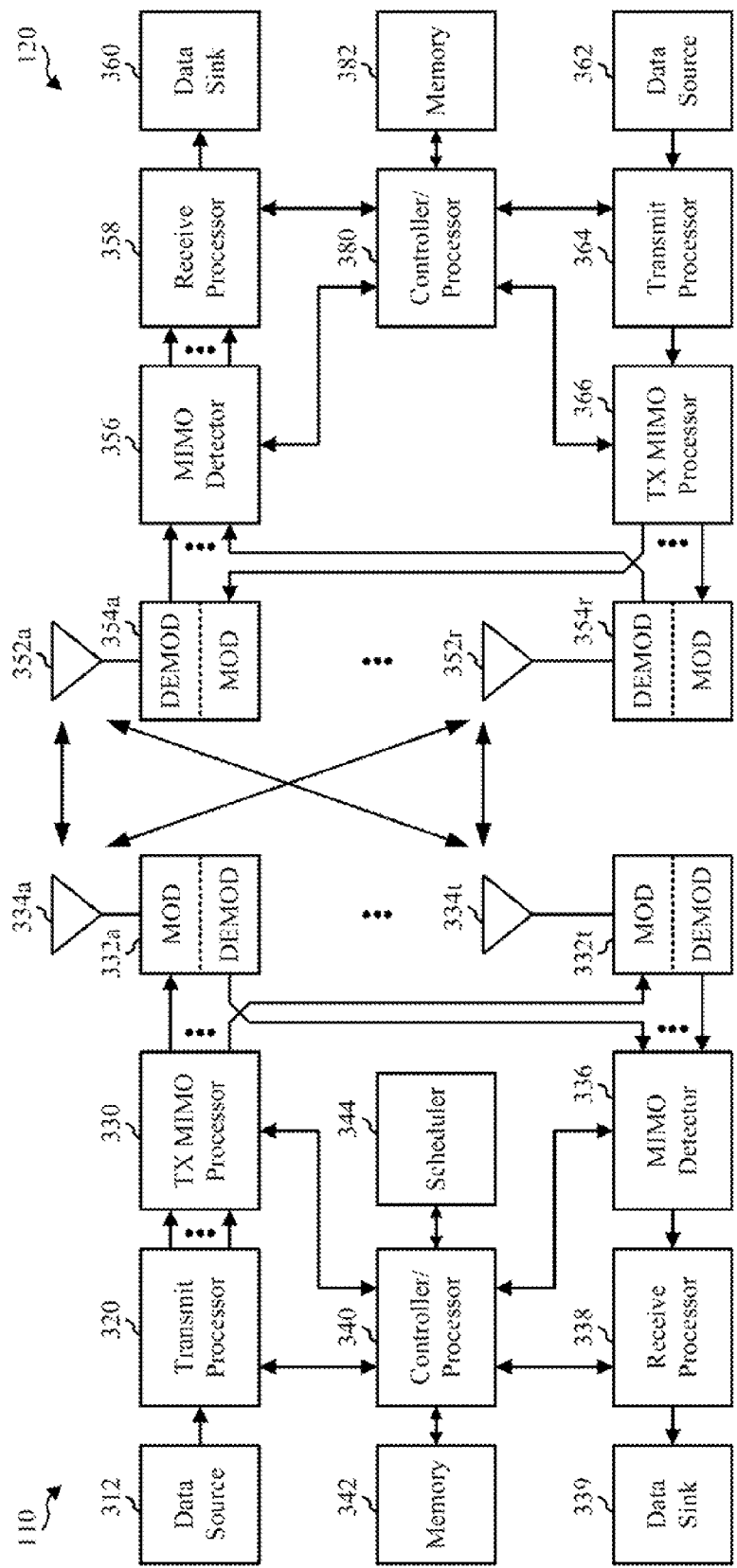
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations for blocks 600 and 800 in FIGS. 6 and 8, and/or other processes for the techniques described herein. The memories 342 and 382 may store data and program codes for base station 110 and UE 120, respectively. A scheduler 344 may schedule UEs for data transmission on the downlink and/or uplink.

Figure 4:
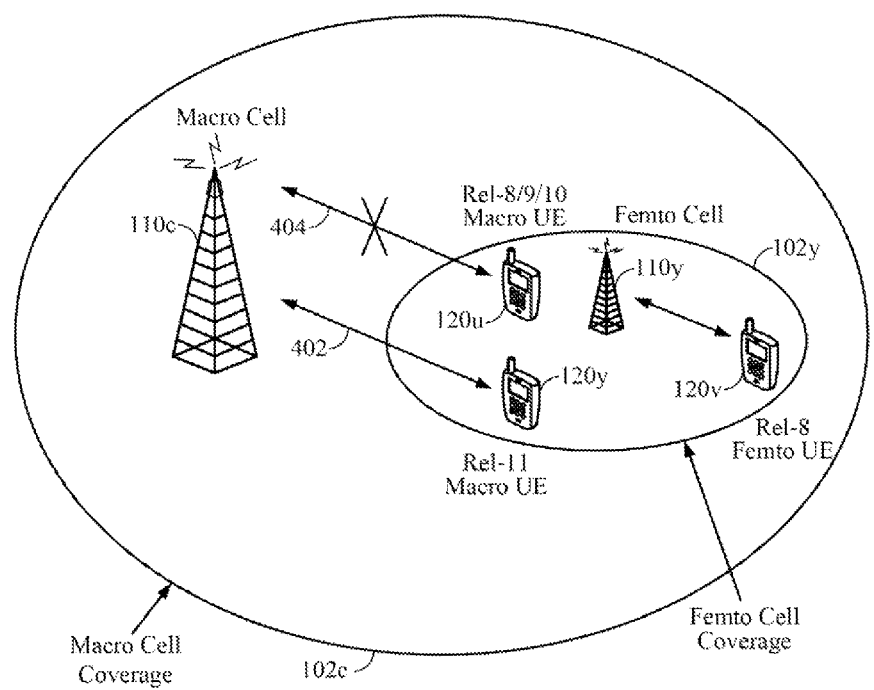
FIG. 4 illustrates an example heterogeneous network having legacy and non-legacy UEs in accordance with certain aspects of the present disclosure.

FIG. 4 illustrates an example heterogeneous network having legacy and non-legacy UEs in accordance with certain aspects of the present disclosure. In certain aspects non-legacy UEs (e.g. Rel 11 macro UE 120y) may support a new carrier type that is not supported by legacy UEs (e.g. Rel 8/9/10 macro UE 120u). Macro cell 110c may transmit PSS/SSS. In LTE Rel-8/9/10, the time locations of PSS/SSS relative to each other for FDD and TDD are designed to be different, in order to facilitate early detection of the frame structure type (FDD or TDD) by the legacy UEs. However, any change of the time locations of PSS/SSS, different from the current Rel-8/9/10 locations, may result in one additional pair of PSS/SSS relative locations—one for FDD and the other for TDD. As a result, if new time locations of PSS/SSS are introduced for the new carrier type, a Rel-11 UE (e.g. non-legacy macro UE 120y) may need to handle four possible sets of PSS/SSS relative locations. This is discussed in more detail below.

In LTE, cell identities range from 0 to 503. Synchronization signals are transmitted in the center 62 resource elements (REs) around the DC tone to help detect cells. The synchronization signals comprise two parts: a Primary Synchronization Signal (PSS) and a Secondary Synchronization Signal (SSS).

Figure 5:
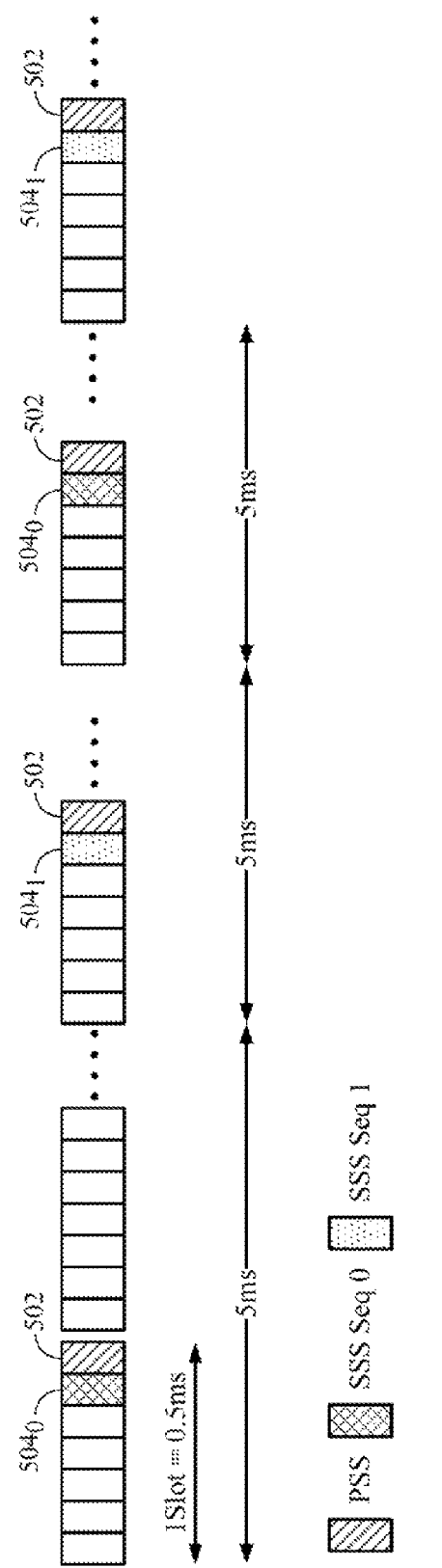
FIG. 5 illustrates an example Primary Synchronization Signal (PSS) sequence and alternating Secondary Synchronization Signal (SSS) sequences with a periodicity of 5 ms, in accordance with certain aspects of the present disclosure.

FIG. 5 illustrates an example PSS sequence 502 and alternating SSS sequences $504_0$, $504_1$ with a periodicity of 5 ms, in accordance with certain aspects of the present disclosure. The PSS allows a UE to obtain frame timing modulo 5 ms and part of the physical layer cell identifier (cell ID), and specifically cell id modulo 3. Three different PSS sequences exist with each sequence mapping to a disjoint group of 168 cell IDs. Based on Zadoff-Chu (ZC) sequences, the PSS sequence is chosen from one of 3 sequences based on a PSS Index=Cell ID modulo 3. The same sequence is transmitted every 5 ms as shown in FIG. 5.

The SSS is used by the UE to detect the LTE frame timing modulo 10 ms and to obtain the cell ID. The SSS is transmitted twice in each 10 ms radio frame as depicted in FIG. 5. The SSS sequences are based on maximum length sequences, known as M-sequences, and each SSS sequence is constructed by interleaving, in the frequency-domain, two length-31 Binary Phase Shift Keying (BPSK)-modulated sequences. These two codes are two different cyclic shifts of a single length-31 M-sequence. The cyclic shift indices of the M-sequences are derived from a function of the physical layer cell identity group. The two codes are alternated between the first and second SSS transmissions in each radio frame.

In other words, two sequences for a cell ID that alternate every 5 ms are transmitted. The SSS sequence is obtained by first choosing from a set of 168 different sequences (different sets for subframes 0 and 5) based on an SSS Index (=floor (Cell ID/3)) and then scrambling the chosen sequence using a sequence which is a function of the PSS Index. Hence, while searching for the SSS, if the PSS Index is known, a UE may only need to search up to 168 sequences.

Spacing between the PSS and the SSS helps a UE to distinguish between Extended Cyclic Prefix (CP) and Normal CP modes and between TDD (Time Division Duplex) and FDD (Frequency Division Duplex) modes.

A typical searching operation may involve first locating the PSS sequences transmitted by neighboring eNBs (i.e., determining the timing and the PSS index), followed by SSS detection for the found PSS Index around the determined timing.

Both PSS and SSS detection may involve using samples over multiple bursts to improve the chances of detection and reduce false detection rates. Using multiple bursts provides time diversity. Spacing the bursts far apart improves the time diversity, but increases the time taken for detection.

Example Synchronization Channel Design for New Carrier Type in LTE-A

In certain aspects, system performance may be improved by introducing at least one new carrier type, NCT (e.g., in the context of carrier aggregation) in standards releases (e.g. LTE Rel-11). Discussed herein are certain aspects related to PSS/SSS design for the new carrier type. In certain aspects, the new carrier type provides additional resources (e.g. time/frequency resources) for communication between a base station (BS) and a user equipment (UE).

In certain aspects, by default, a same PSS/SSS design as earlier releases (e.g., Rel. 8) may be maintained for the new carrier type, including the sequence design and the time-frequency location of the PSS/SSS. However, legacy UEs (e.g., Rel-8 UE) that do not support the new carrier type may unnecessarily waste resources (e.g., time and power) to acquire the PSS and SSS of the new carrier type only to be barred from further camping on the new carrier type later. This may lead to wastage of UE resources.

As used herein, the term "legacy" generally refers to devices, structures, designs, or the like that are compatible with an earlier version of a standard and is a relative term. For example, "legacy" may refer to Rel 8/9/10 while Rel 11 or later may be referred to as "non-legacy."

Thus, in certain aspects, there may be a benefit in legacy UEs finding out quickly that a frequency belongs to the new carrier type, or making the NCT invisible to legacy UEs.

One way to make the NCT invisible to legacy UEs is to use a new PSS/SSS design for the NCT different from the legacy PSS/SSS design. In an aspect, the non-backward compatible new PSS/SSS design may make the new carrier invisible to the legacy UEs, and consequently, save the legacy UEs from spending resources on any subsequent procedures after PSS/SSS acquisition (and before being barred from further camping on the new carrier type at a later stage). However, in certain aspects, it may not be easy to re-design a new set of PSS/SSS sequences for the new carrier type, since it may involve a lot of standardization and implementation efforts. Thus, in certain aspects, the same Rel-8 PSS/SSS sequences may be used by the new carrier type at least for non-synchronization new carriers.

Currently (e.g. in Rel-8/9/10), the frequency location of PSS/SSS makes it possible for the UE to acquire PSS/SSS prior to knowledge about system bandwidth. In an aspect, such property of the current systems may be retained in cases where the new carrier type is used.

In LTE Rel-8/9/10, the time locations of PSS/SSS relative to each other for frequency division duplex (FDD) and time division duplex (TDD) are designed to be different, in order to facilitate early detection of the frame structure type (FDD or TDD). In certain aspects, in addition to the legacy FDD and TDD positions, additional relative positions for PSS and SSS may be defined to differentiate between FDD and TDD of the new carrier type. Any change of the time locations of PSS/SSS, different from the current Rel-8/9/10 locations, may result in one additional pair of PSS/SSS relative locations—one for FDD and the other for TDD.

As a result, if new time locations of PSS/SSS are introduced for the new carrier type, even if a legacy UE detects the PSS of the new carrier type, it may not detect the corresponding SSS due to the new relative positions of the PSS-SSS defined for the new carrier type, and may give up relatively quickly. However, a non-legacy UE may need to handle four possible sets of PSS/SSS relative locations. The new time locations also need to consider the location of physical broadcast channel (PBCH), and potentially, the symbols containing demodulation reference signal (DM-RS). This means more time and power consumption.

In certain aspects, a non-legacy UE may first (e.g., by default) search for the legacy PSS/SSS locations and attach to a cell that transmits the legacy PSS/SSS. Then the UE may be provided with a channel list that explicitly identifies the channels on which the UE may perform search for the PSS/SSS signals of a new carrier, assuming only the new locations and not the legacy locations. Thus, it may not be necessary for a non-legacy UE to search for four possible sets of PSS/SSS relative locations. For example, the UE may first detect the PSS/SSS at legacy locations, and then receive information indicating a search space for the PSS/SSS for the new carrier type. The UE may then search for the PSS/SSS of the new carrier based on the received information. In an aspect, this technique may be used only if the new carrier type is in a carrier aggregation configuration with a legacy carrier type.

In certain aspects, the received information may include two bits, one bit for indicating new carrier type, and the second bit for indicating FDD or TDD mode. Alternatively, the second bit may be implicitly included in the band number or channel number of the carrier. In an aspect, the information may include at least one bit to indicate that a carrier belongs to a new carrier type. In certain aspects, a relative spacing in time between PSS and SSS may be the same regardless of whether the second bit indicates FDD or TDD mode. In some implementations, the received information may be included in a Master Information Block (MIB) carried on the PBCH channel or a System Information Block (SIB) carried on the PDSCH channel. In an aspect, the information may be provided to the UE in a neighbour list, including a unicast or broadcast neighbour list. After identifying the PSS/SSS of the new carrier, the UE may register with the new carrier and utilize the additional bandwidth of the new carrier in aggregation with the legacy carrier.

According to certain aspects, the information transmitted to the UE may comprise at least one bit indicating the cyclic prefix type of the second carrier.

According to certain aspects, a relative spacing in time between PSS and SSS may be different depending on whether a frequency division duplexing (FDD) mode or a time division duplexing (TDD) mode is used.

Figure 6:
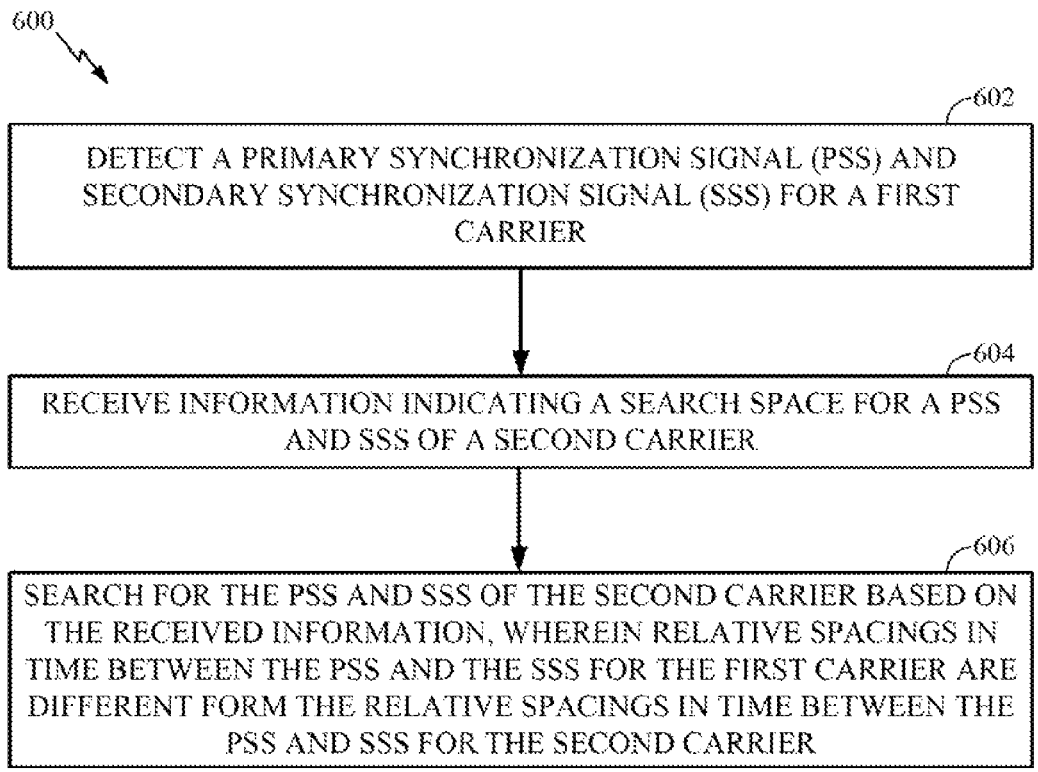
FIG. 6 illustrates example operations, performed by a user equipment (UE), for detecting PSS/SSS of a new carrier type in accordance with certain aspects of the present disclosure.

FIG. 6 illustrates example operations 600, performed by a UE, for detecting PSS/SSS of a new carrier type in accordance with certain aspects of the present disclosure.

Operations 600 may begin, at 602 by detecting a PSS and an SSS for a first carrier. At 604, information may be received indicating a search space for a PSS and SSS of a second carrier. At 606, the PSS and SSS of the second carrier may be searched, based on the received information. In an aspect, relative spacings in time between the PSS and SSS for the first carrier may be different from the relative spacings in time between the PSS and SSS for the second carrier. In an aspect, the first carrier may be a legacy carrier and the second carrier may belong to a new carrier type. In an aspect, the information may be received after initiation of an active call. In an alternative aspect, the information may be received at or during acquisition procedures. In an aspect, the information may be received in a neighbor list, for example, a unicast neighbor list or a broadcast neighbor list.

In an aspect, periodicity of the PSS and SSS for the first carrier is same as periodicity of the PSS and SSS for the second carrier.

In some cases, the information may include one or more bits. For example, the information may include at least one bit indicating whether the second carrier is a legacy carrier (recognizable by "legacy" UEs) or new carrier (not recognizable by "legacy" UEs). In an aspect, the information may include at least one bit indicating that the second carrier is a carrier not supported by legacy UEs. The information may also include at least one bit indicating the duplexing mode, e.g., TDD or FDD. Alternatively, the duplexing mode may be implicitly indicated by the band number or channel number of the carrier. Thus, it may not be necessary to maintain different relative positions of the PSS/SSS signals in order to distinguish between FDD and TDD for the new carrier. In an aspect, the information may also include at least one bit indicating the cyclic prefix type of the second carrier.

In certain aspects, a relative spacing in time between PSS and SSS may be different depending on whether a FDD mode or a TDD mode is used. In an aspect, relative spacings in time between PSS and SSS for the first carrier may be different from the relative spacings in time between PSS and SSS for the second carrier.

In certain aspects, a relative spacing in time between PSS and SSS may be the same regardless of whether the received information indicates a FDD mode or a TDD mode.

Figure 6A:
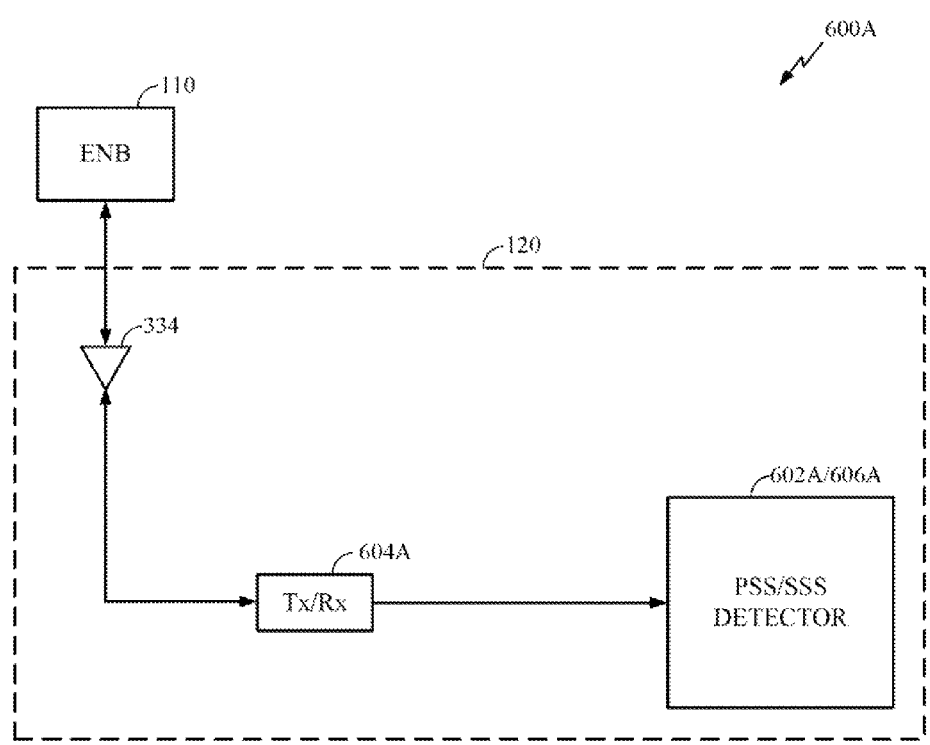
FIG. 6A illustrates example components capable of performing the operations illustrated in FIG. 6, in accordance with certain aspects of the present disclosure.

The operations 600 described above may be performed by any suitable components or other means capable of performing the corresponding functions of FIG. 6. For example, operations 600 illustrated in FIG. 6 may correspond to components 600A illustrated in FIG. 6A. In FIG. 6A, the transceiver 604A may receive a signal on a first carrier and the PSS/SSS detector 602A may detect a PSS and SSS for the first carrier. The transceiver 604A may thereafter receive information indicating a search space for a PSS and SSS of a second carrier. The detector 606A may then search for the PSS and SSS of the second carrier based on the received information.

Figure 7:
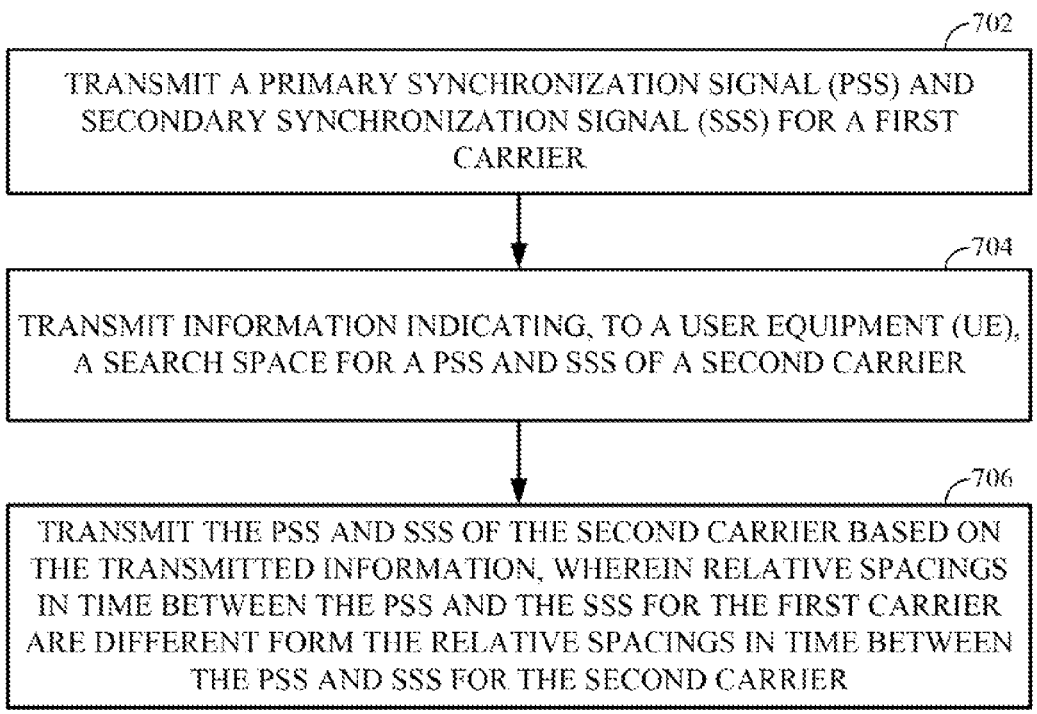
FIG. 7 illustrates example operations, performed by a base station (BS), for transmitting PSS/SSS of a new carrier type in accordance with certain aspects of the present disclosure.

FIG. 7 illustrates example operations 700, performed by a base station (BS), for transmitting PSS/SSS of a new carrier type in accordance with certain aspects of the present disclosure.

Operations 700 may begin, at 702 by transmitting a PSS and SSS for a first carrier. At 704, information may be transmitted to a UE indicating a search space for a PSS and SSS of a second carrier. At 706, the PSS and the SSS of the second carrier may be transmitted based on the transmitted information. In an aspect, relative spacings in time between the PSS and SSS for the first carrier may be different from the relative spacings in time between the PSS and SSS for the second carrier. In an aspect, the first carrier may be a legacy carrier and the second carrier may belong to a new carrier type. In an aspect, the information may be transmitted after initiation of an active call. In an alternative aspect, the information may be transmitted at or during acquisition procedures. In an aspect, the information may be transmitted in a neighbor list, for example, a unicast neighbor list or a broadcast neighbor list.

In an aspect, periodicity of the PSS and SSS for the first carrier is same as periodicity of the PSS and SSS for the second carrier.

In some cases, the information may include one or more bits. For example, the information may include at least one bit indicating whether the carrier is a legacy carrier (recognizable by "legacy" UEs) or new carrier (not recognizable by "legacy" UEs). In an aspect, the information may include at least one bit indicating that the second carrier is a carrier not supported by legacy UEs. The information may also include at least one bit indicating the duplexing mode, e.g., TDD or FDD. Alternatively, the duplexing mode may be implicitly indicated by the band number or channel number of the carrier. Thus, it may not be necessary to maintain different relative positions of the PSS/SSS signals in order to distinguish between FDD and TDD for the new carrier. In an aspect, the information may also include at least one bit indicating the cyclic prefix type of the second carrier.

In certain aspects, a relative spacing in time between PSS and SSS may be different depending on whether a FDD mode or a TDD mode is used. In an aspect, relative spacings in time between PSS and SSS for the first carrier may be different from the relative spacings in time between PSS and SSS for the second carrier.

In certain aspects, a relative spacing in time between PSS and SSS may be the same regardless of whether the received information indicates a FDD mode or a TDD mode.

In certain aspects, a UE typically looks for frequencies at a 100 kHz raster. Thus, if the PSS/SSS positions are moved such that their frequency locations do not fall on the 100 KHz raster, then the UEs may not find it. Thus, in certain aspects, a new carrier type may be made invisible to the legacy UEs by moving the PSS/SSS in frequency relative to the frequency raster, e.g. by placing the PSS/SSS center on a frequency that is offset relative to standard center frequencies by an offset value (e.g., k*100 kHz+n*15 kHz, for some k and some n). The value of n may be selected, for example, to multiply the carrier spacing value (15 kHz in the present example) to put a search space nearly in the middle of 100 kHz center frequencies. For example, n=3 would result in an offset of 45 kHz, which is near the 50 kHz midpoint between adjacent 100 kHz center frequencies.

The value of n may be known a-priori (e.g., set by a standard) or signalled to a UE by an eNB.

Figure 8:
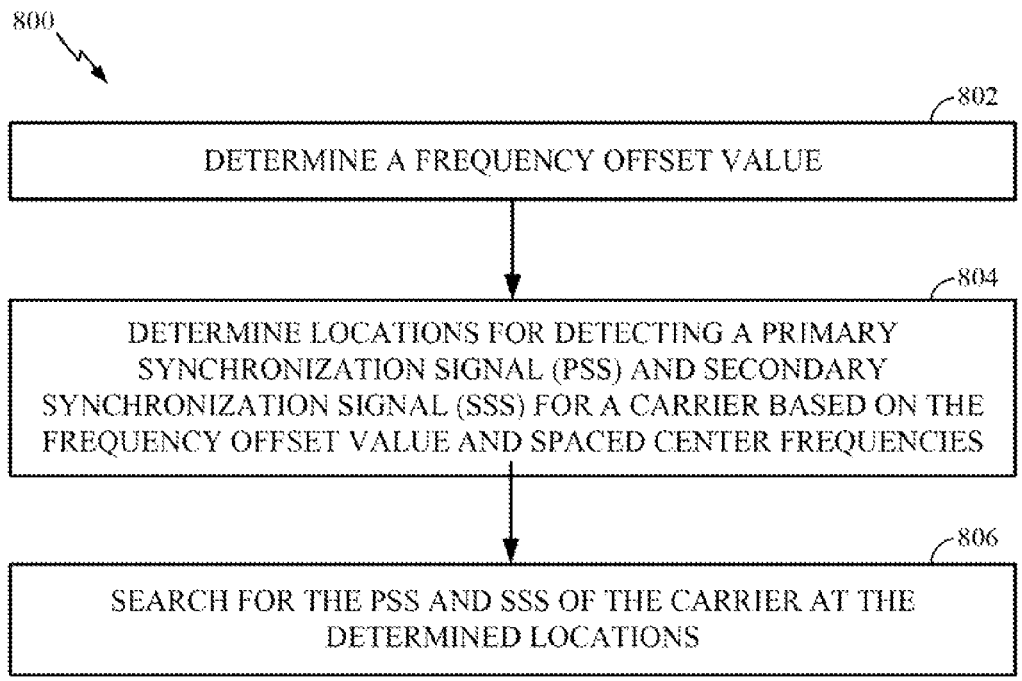
FIG. 8 illustrates example operations, performed by a UE, for detecting PSS/SSS of a new carrier type in accordance with certain aspects of the present disclosure.

FIG. 8 illustrates example operations 800, performed by a UE, for detecting PSS/SSS of a new carrier type in accordance with certain aspects of the present disclosure.

Operations 800 may begin, at 802 by determining a frequency offset value. At 804, locations for a PSS and SSS may be determined for a carrier based on the frequency offset value and spaced center frequencies. At 806, the PSS and SSS of the carrier may be searched at the determined locations. In an aspect, the frequency offset value may be greater than an anticipated frequency error of the UE. In an aspect, operations 800 may further include receiving information indicating the frequency offset value. In an aspect, the frequency offset value may include an integer value times a frequency bandwidth value. In an aspect, the carrier may include a carrier of the new carrier type that may not be supported by legacy UEs.

Figure 8A:
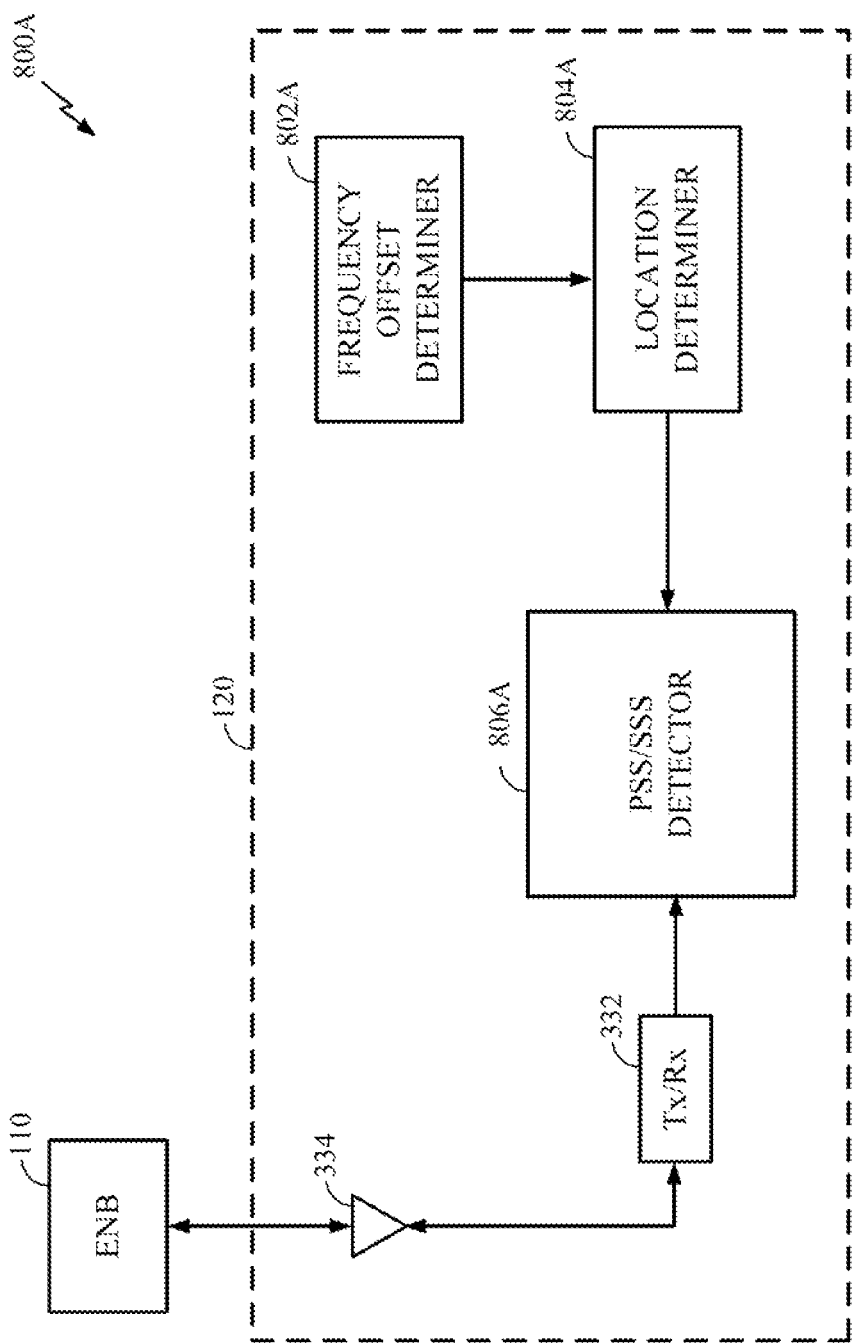
FIG. 8A illustrates example components capable of performing the operations illustrated in FIG. 8, in accordance with certain aspects of the present disclosure.

The operations 800 described above may be performed by any suitable components or other means capable of performing the corresponding functions of FIG. 8. For example, operations 800 illustrated in FIG. 8 may correspond to components 800A illustrated in FIG. 8A. In FIG. 8A, a frequency offset determiner 802A may determine a frequency offset value. A location determiner 804A may determine locations for detecting a PSS and SSS for a carrier based on the frequency offset value and spaced center frequencies. Thereafter, a PSS/SSS detector 806A may search for the PSS and SSS of the carrier at the determined locations.

Figure 9:
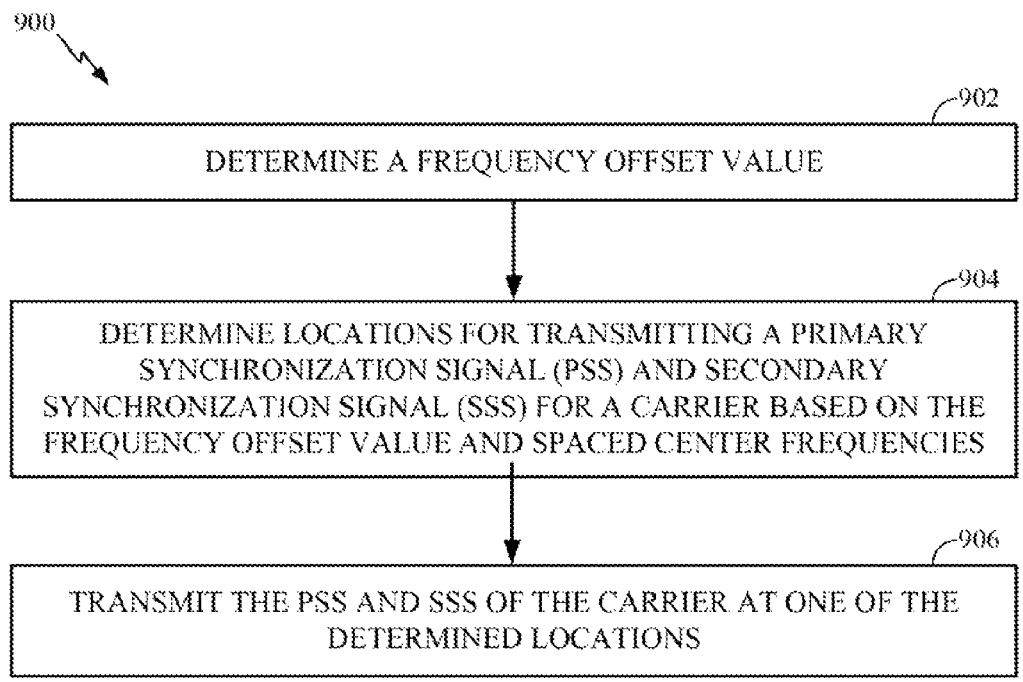
FIG. 9 illustrates example operations, performed by a base station (BS), for transmitting PSS/SSS of a new carrier type in accordance with certain aspects of the present disclosure.

FIG. 9 illustrates example operations 900, performed by a base station (BS), for transmitting PSS/SSS of a new carrier type in accordance with certain aspects of the present disclosure.

Operations 900 may begin, at 902, by determining a frequency offset value. At 904, locations may be determined for transmitting a PSS and SSS for a carrier, for detection by a UE, based on the frequency offset value and spaced center frequencies. At 906, the PSS and the SSS of the carrier may be transmitted at one of the determined locations. In an aspect the frequency offset value may be greater than an anticipated frequency error of the UE. In an aspect, operations 900 may further include transmitting information indicating the frequency offset value. In an aspect, the frequency offset value may include an integer value times a frequency bandwidth value. In an aspect, the carrier may include a carrier of the new carrier type that may not be supported by legacy UEs.

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, means for transmitting or means for sending may comprise a transmitter, a modulator 354, and/or an antenna 352 of the UE 120 depicted in FIG. 3 or a transmitter, a modulator 332, and/or an antenna 334 of the eNB 110 shown in FIG. 3. Means for receiving may comprise a receiver, a demodulator 354, and/or an antenna 352 of the UE 120 depicted in FIG. 3 or a receiver, a demodulator 332, and/or an antenna 334 of the eNB 110 shown in FIG. 3. Means for processing, means for determining, means for sampling, and/or means for cancelling out may comprise a processing system, which may include at least one processor, such as the transmit processor 320, the receive processor 338, or the controller/processor 340 of the eNB 110 or the receive processor 358, the transmit processor 364, or the controller/processor 380 of the UE 120 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
   detecting a primary synchronization signal (PSS) and secondary synchronization signal (SSS) for a first carrier;
   receiving through the first carrier, after detecting the PSS and the SSS for the first carrier, information indicating a search space for a PSS and SSS of a second carrier, wherein the information comprises at least one bit indicating a duplexing mode for communicating on the second carrier, and further wherein the second carrier is a carrier not recognizable by certain types of UEs; and
   searching for the PSS and SSS of the second carrier based on the received information,
   wherein relative spacings in time between the PSS and SSS for the first carrier are different from the relative spacings in time between the PSS and SSS for the second carrier.

2. The method of claim 1, wherein the information is received after initiation of an active call.

3. The method of claim 1, wherein the information is received at or during acquisition procedures.

4. The method of claim 1, wherein the information is received in a neighbor list.

5. The method of claim 4, wherein the neighbor list comprises a unicast neighbor list or a broadcast neighbor list.

6. The method of claim 1, wherein the information comprises at least one bit indicating the second carrier is a carrier not supported by the certain types of UEs.

7. The method of claim 6, wherein the certain types of UEs comprise legacy UEs.

8. The method of claim 1, wherein the information comprises at least a band number or channel number indicating a duplexing mode for communicating on the second carrier.

9. The method of claim 1, wherein the information comprises at least one bit indicating cyclic prefix type of the second carrier.

10. The method of claim 1, wherein a relative spacing in time between PSS and SSS for the first and second carriers is different depending on whether a frequency division duplexing (FDD) mode or a time division duplexing (TDD) mode is used.

11. The method of claim 1, wherein periodicity of the PSS and SSS for the first carrier is same as periodicity of the PSS and SSS for the second carrier.

12. The method of claim 1, wherein a relative spacing in time between PSS and SSS is the same regardless of whether the at least one bit indicates a frequency division duplexing (FDD) mode or a time division duplexing (TDD) mode.

13. An apparatus for wireless communications by a user equipment (UE), comprising:
   means for detecting a primary synchronization signal (PSS) and secondary synchronization signal (SSS) for a first carrier;
   means for receiving through the first carrier, after detecting the PSS and the SSS for the first carrier, information indicating a search space for a PSS and SSS of a second carrier, wherein the information comprises at least one bit indicating a duplexing mode for communicating on the second carrier, and further wherein the second carrier is a carrier not recognizable by certain types of UEs; and
   means for searching for the PSS and SSS of the second carrier based on the received information,
   wherein relative spacings in time between the PSS and SSS for the first carrier are different from the relative spacings in time between the PSS and SSS for the second carrier.

14. The apparatus of claim 13, wherein the information is received after initiation of an active call.

15. The apparatus of claim 13, wherein the information is received at or during acquisition procedures.

16. The apparatus of claim 13, wherein the information is received in a neighbor list.

17. The apparatus of claim 16, wherein the neighbor list comprises a unicast neighbor list or a broadcast neighbor list.

18. The apparatus of claim 13, wherein the information comprises at least one bit indicating the second carrier is a carrier not supported by the certain types of UEs.

19. The apparatus of claim 18, wherein the certain types of UEs comprise legacy UEs.

20. The apparatus of claim 13, wherein the information comprises at least a band number or channel number indicating a duplexing mode for communicating on the second carrier.

21. The apparatus of claim 13, wherein the information comprises at least one bit indicating cyclic prefix type of the second carrier.

22. The apparatus of claim 13, wherein a relative spacing in time between PSS and SSS for the first and second carriers is different depending on whether a frequency division duplexing (FDD) mode or a time division duplexing (TDD) mode is used.

23. The apparatus of claim 13, wherein periodicity of the PSS and SSS for the first carrier is same as periodicity of the PSS and SSS for the second carrier.

24. The apparatus of claim 13, wherein a relative spacing in time between PSS and SSS is the same regardless of whether the at least one bit indicates a frequency division duplexing (FDD) mode or a time division duplexing (TDD) mode.

25. An apparatus for wireless communications by a user equipment (UE), comprising:
   at least one processor configured to:
      detect a primary synchronization signal (PSS) and secondary synchronization signal (SSS) for a first carrier;
      receive through the first carrier, after detecting the PSS and the SSS for the first carrier, information indicating a search space for a PSS and SSS of a second carrier, wherein the information comprises at least one bit indicating a duplexing mode for communicating on the second carrier, and further wherein the second carrier is a carrier not recognizable by certain types of UEs; and
      search for the PSS and SSS of the second carrier based on the received information,
      wherein relative spacings in time between the PSS and SSS for the first carrier are different from the relative spacings in time between the PSS and SSS for the second carrier; and
   a memory coupled to the at least one processor.

26. A non-transitory computer-readable medium for wireless communications by a user equipment (UE), the non-transitory computer-readable medium comprising code for:
- detecting a primary synchronization signal (PSS) and secondary synchronization signal (SSS) for a first carrier;
- receiving through the first carrier, after detecting the PSS and the SSS for the first carrier, information indicating a search space for a PSS and SSS of a second carrier, wherein the information comprises at least one bit indicating a duplexing mode for communicating on the second carrier, and further wherein the second carrier is a carrier not recognizable by certain types of UEs; and
- searching for the PSS and SSS of the second carrier based on the received information,
- wherein relative spacings in time between the PSS and SSS for the first carrier are different from the relative spacings in time between the PSS and SSS for the second carrier.

27. A method for wireless communications by a base station (BS), comprising:
- transmitting a primary synchronization signal (PSS) and secondary synchronization signal (SSS) for a first carrier;
- transmitting through the first carrier, after transmitting the PSS and the SSS for the first carrier, information indicating, to a user equipment (UE), a search space for a PSS and SSS of a second carrier, wherein the information comprises at least one bit indicating a duplexing mode for communicating on the second carrier, and further wherein the second carrier is a carrier not recognizable by certain types of UEs; and
- transmitting the PSS and SSS of the second carrier based on the transmitted information wherein relative spacings in time between the PSS and SSS for the first carrier are different from the relative spacings in time between the PSS and SSS for the second carrier.

28. The method of claim 27, wherein the information is transmitted after initiation of an active call.

29. The method of claim 27, wherein the information is transmitted at or during acquisition procedures.

30. The method of claim 27, wherein the information is transmitted in a neighbor list.

31. The method of claim 30, wherein the neighbor list comprises a unicast neighbor list or a broadcast neighbor list.

32. The method of claim 27, wherein the information comprises at least one bit indicating the second carrier is a carrier not supported by the certain types of UEs.

33. The method of claim 32, wherein the certain types of UEs comprise legacy UEs.

34. The method of claim 27, wherein the information comprises at least one bit indicating cyclic prefix type of the second carrier.

35. The method of claim 27, wherein a relative spacing in time between PSS and SSS for the first and second carriers is different depending on whether a frequency division duplexing (FDD) mode or a time division duplexing (TDD) mode is used.

36. The method of claim 27, wherein periodicity of the PSS and SSS for the first carrier is same as periodicity of the PSS and SSS for the second carrier.

37. The method of claim 27, wherein a relative spacing in time between PSS and SSS is the same regardless of whether the at least one bit indicates a frequency division duplexing (FDD) mode or a time division duplexing (TDD) mode.

38. An apparatus for wireless communications by a base station (BS), comprising:
- means for transmitting a primary synchronization signal (PSS) and secondary synchronization signal (SSS) for a first carrier;
- means for transmitting through the first carrier, after transmitting the PSS and the SSS for the first carrier, information indicating, to a user equipment (UE), a search space for a PSS and SSS of a second carrier, wherein the information comprises at least one bit indicating a duplexing mode for communicating on the second carrier, and further wherein the second carrier is a carrier not recognizable by certain types of UEs; and
- means for transmitting the PSS and SSS of the second carrier based on the transmitted information,
- wherein relative spacings in time between the PSS and SSS for the first carrier are different from the relative spacings in time between the PSS and SSS for the second carrier.

39. The apparatus of claim 38, wherein the information is transmitted after initiation of an active call.

40. The apparatus of claim 38, wherein the information is transmitted at or during acquisition procedures.

41. The apparatus of claim 38, wherein the information is transmitted in a neighbor list.

42. The apparatus of claim 41, wherein the neighbor list comprises a unicast neighbor list or a broadcast neighbor list.

43. The apparatus of claim 38, wherein the information comprises at least one bit indicating the second carrier is a carrier not supported by the certain types of UEs.

44. The apparatus of claim 43, wherein the certain types of UEs comprise legacy UEs.

45. The apparatus of claim 38, wherein the information comprises at least one bit indicating cyclic prefix type of the second carrier.

46. The apparatus of claim 38, wherein a relative spacing in time between PSS and SSS for the first and second carriers is different depending on whether a frequency division duplexing (FDD) mode or a time division duplexing (TDD) mode is used.

47. The apparatus of claim 38, wherein periodicity of the PSS and SSS for the first carrier is same as periodicity of the PSS and SSS for the second carrier.

48. The apparatus of claim 38, wherein a relative spacing in time between PSS and SSS is the same regardless of whether the at least one bit indicates a frequency division duplexing (FDD) mode or a time division duplexing (TDD) mode.

49. An apparatus for wireless communications by a base station (BS), comprising:
- at least one processor configured to:
  - transmit a primary synchronization signal (PSS) and secondary synchronization signal (SSS) for a first carrier;
  - transmit through the first carrier, after transmitting the PSS and the SSS for the first carrier, information indicating, to a user equipment (UE), a search space for a PSS and SSS of a second carrier, wherein the information comprises at least one bit indicating a duplexing mode for communicating on the second carrier, and further wherein the second carrier is a carrier not recognizable by certain types of UEs; and
  - transmit the PSS and SSS of the second carrier based on the transmitted information, wherein relative spacings in time between the PSS and SSS for the first carrier are different from the relative spacings in time between the PSS and SSS for the second carrier; and a memory coupled to the at least one processor.

50. A non-transitory computer-readable medium for wireless communications by a base station (BS), the non-transitory computer-readable medium comprising code for:

transmitting a primary synchronization signal (PSS) and secondary synchronization signal (SSS) for a first carrier;

transmitting through the first carrier, after transmitting the PSS and the SSS for the first carrier, information indicating, to a user equipment (UE), a search space for a PSS and SSS of a second carrier, wherein the information comprises at least one bit indicating a duplexing mode for communicating on the second carrier, and further wherein the second carrier is a carrier not recognizable by certain types of UEs; and transmitting the PSS and SSS of the second carrier based on the transmitted information, wherein relative spacings in time between the PSS and SSS for the first carrier are different from the relative spacings in time between the PSS and SSS for the second carrier.

* * * * *